June 12, 1934.  W. J. WALDON  1,962,289
BEARING EXTRACTING DEVICE
Filed Dec. 18, 1933   2 Sheets-Sheet 1

Inventor
W. J. Waldon
By Clarence A. O'Brien
Attorney

June 12, 1934.  W. J. WALDON  1,962,289
BEARING EXTRACTING DEVICE
Filed Dec. 18, 1933   2 Sheets-Sheet 2
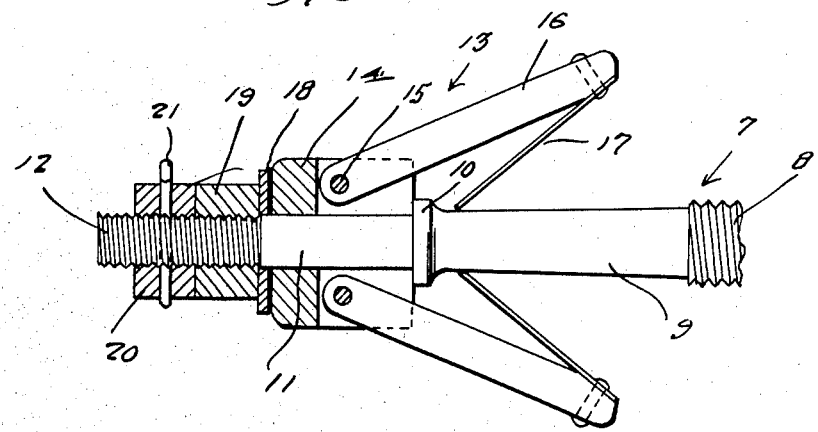
Fig. 4.
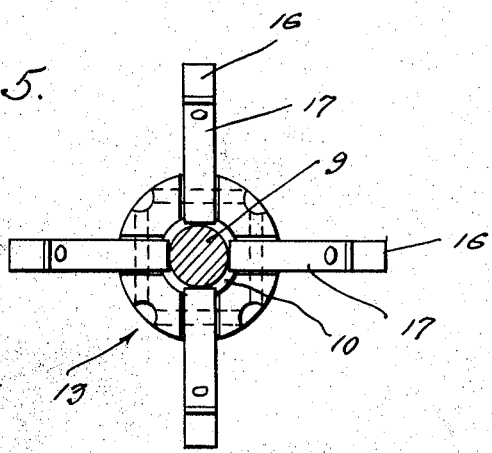
Fig. 5.
Fig. 6.
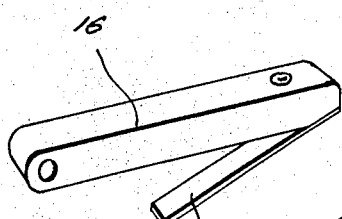
Inventor
W. J. Waldon
By Clarence A. O'Brien
Attorney Patented June 12, 1934

1,962,289

UNITED STATES PATENT OFFICE 1,962,289

BEARING EXTRACTING DEVICE

William J. Waldon, Taft, Calif., assignor of one-fourth to J. R. Dorsey, Bakersfield, Calif.

Application December 18, 1933, Serial No. 702,998

1 Claim. (Cl. 29—88.2)

This invention relates to a novel and improved device for removing bearings from automobile axle housings, the same being especially useful in removing a Timken bearing race and oil retainer.

In carrying the principles of the invention into actual practice, I have evolved and produced a simple and economical arrangement which is susceptible of practicable usage in connection with the removal of bearings from the rear axle housing of practically all makes of automobiles and trucks.

As will be pointed out in detail later on in the description, considerable difficulty is encountered in the present day method of removing bearings from axle housings. Therefore I have discovered the need for the provision of a simple and efficient tool which is susceptible of expeditious insertion and capable of satisfactory action in effecting the easy removal of the bearing means.

In the accompanying drawings wherein like numerals are employed to designate like parts throughout the same:

Figure 4 is a view in section and elevation detailing the construction and mounting of the expansible and contractible thrust producing unit.

Figure 5 is an elevational view of the unit observing it in the direction from right to left in Figure 4.

Figure 6 is a perspective view of one of the spring-pressed expansible and retractible thrust fingers.

Figure 1:
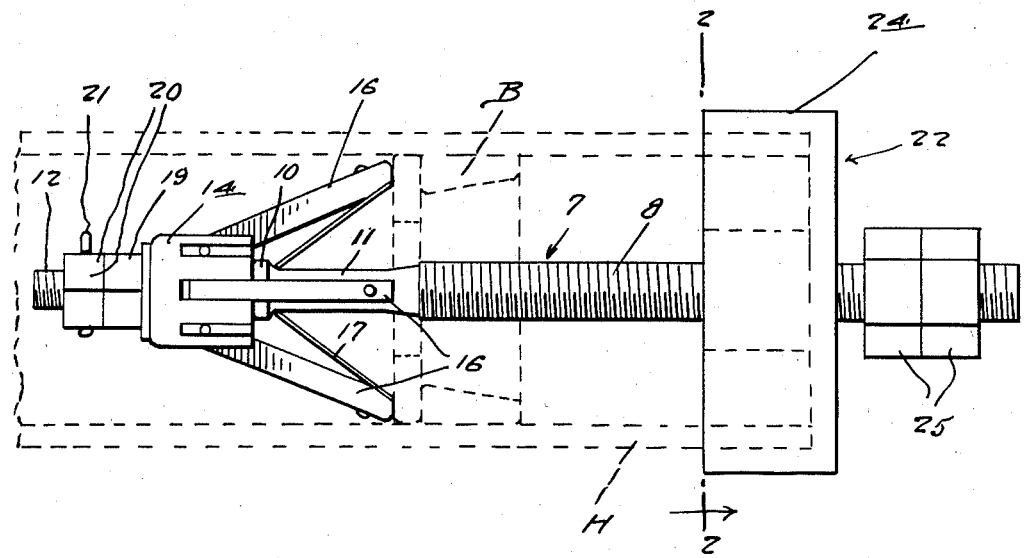
Figure 1 is an elevational view showing the construction of the device and disclosing the manner in which it is associated with the axle housing and bearing (the latter parts being shown in dotted lines).
Figure 2:
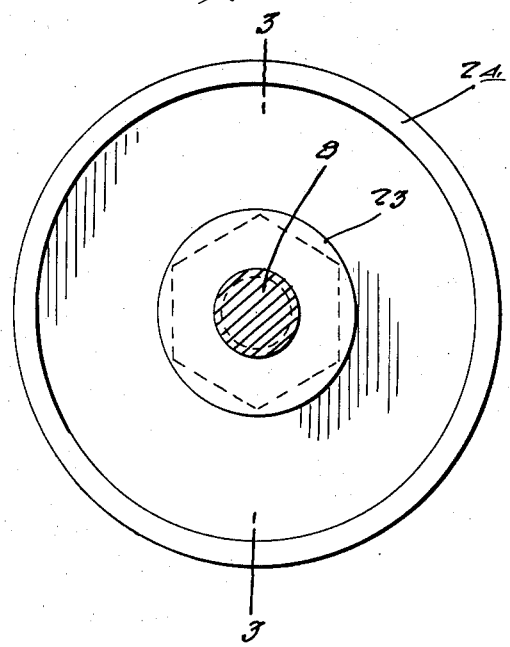
Figure 2 is a section taken approximately on the plane of the line 2—2 of Figure 1.

Referring now to the drawings by distinguishing reference characters, it will be observed that an essential part of the structure may be distinguished as a shaft 7. This comprises a major screw-threaded portion 8 which functions as a feed screw. Then as best shown in Figure 4 the left hand end portion thereof is fashioned with a smooth extension which may be described as a stem 9 having a shoulder 10 beyond which is a reduced terminal forming a spindle 11 and a screw-threaded stud 12.

The numeral 13 designates the swivelly mounted thrust unit carried by the spindle 11. As indicated in Figure 4 this thrust unit is mounted for free rotation on the spindle and bears against the shoulder or stop flange 10. It comprises a collar 14 having circumferentially spaced notches to accommodate the inner pivoted ends 15 of the expansible and contractible thrust fingers 16. These fingers are projected outwardly through the instrumentality of flat springs 17 carried by the free ends thereof and bearing at their inner ends against the stem 9. The numeral 18 merely designates a wear washer, 19 a retaining nut on the stud 12, and 20 a lock nut held in place by a cotter key 21.

Figure 3:
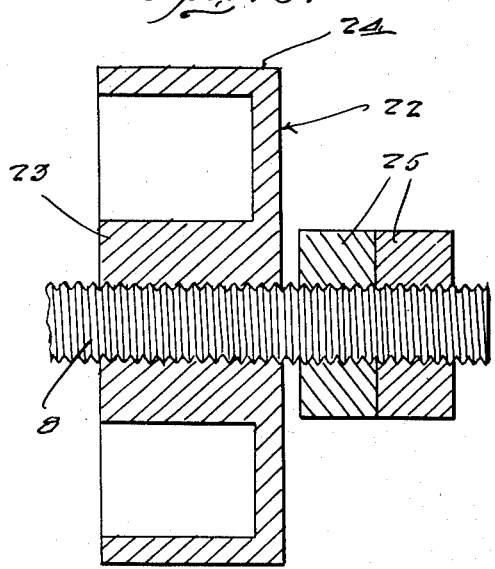
Figure 3 is a section taken approximately on the plane of the line 3—3 of Figure 2.

The attaching and retaining unit for the shaft and thrust means is denoted by the numeral 22 and comprises a feed nut 23 (see Figure 3) to accommodate the feed screw, and an integral sustaining cap 24 carried thereby. The cap 24 is made to slip over and snugly receive the outer end of the axle housing H as shown in Figure 1 so as to preclude lateral deflection of the shaft 7 and assure the pull being in a straight line. Incidentally, the bearing means to be removed from this housing H is shown in dotted lines and has been denoted by the letter B. This part B being of centrally bored construction it is obvious that the entire inner end portion of the shaft 7 and the thrust means carried thereby can be slipped in through this bore. In pushing the thrust means through the bore the fingers 16 are contracted and immediately upon passing through and beyond said bore, the fingers expand to the operating positions shown in Figure 1. By then adjusting the feed nut 23 into place it is obvious that upon turning the shaft 7 in the proper direction an endwise pull and thrust is produced against the bearing B to dislodge and remove it. Incidentally, ordinary nuts 25 may be placed on the extended end portion of the feed screw 8 as shown in Figure 1 to accommodate a wrench or tool (not shown) used for turning said feed screw.

Without the use of a device for removing this race and oil retainer the process is a slow and tedious job, it being necessary to force the race outward by repeated light taps on an inverted bar, or some other similar means. Attempting to remove this race without a device similar to this invention is slow work, requiring in many cases several hours to remove the race and oil retainer, it being necessary to force the race and retainer outward from the housing separately. The housing being small it is difficult to get a tool back of the race and oil retainer for the purpose of forcing it outward, therefore, it would be necessary to insert the end of a bar in the housing back of the race, leaving one end of the bar outside of the housing, and then continuously tap on this bar, revolving the tool in the housing back of the race at each successive tap on the bar, or in some other crude, ineffectual manner by ordinary tools to force the race outward and after thus removing the race a similar procedure will be necessary to then remove the oil retainer.

By the old method just mentioned, there is at all times danger of injuring the housing by the continual hammering, and by the use of bars, chisels, screw drivers and other tools with which to force the race and oil retainer outward. Also, by the use of this invention it is impossible to injure the housing either inside or outside, nor can the race and oil retainer be injured in any way.

This device permits the removal of both race and oil retainer in one operation. The fingers on the collar are the same length and are uniformly set against the back of the oil retainer, the result of which is the retainer and race are forced outward simultaneously and without binding, all portions thereof moving outward uniformly.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

In a device for extracting a bearing from a housing and in combination, a threaded shaft adapted to be inserted through the housing and the bearing in the housing, means on the shaft adapted to pass through the bearing and expand back of the bearing to constitute a puller therefor, a nut on the threaded shaft equipped with an integral cap of a size to snugly receive the housing end and bear against the same, and means whereby the shaft may be turned about its axis through and in engagement with said nut.

WILLIAM J. WALDON.